United States Patent [19]

Kaplan et al.

[11] 4,410,239

[45] Oct. 18, 1983

[54] NONLINEAR OPTICAL DEVICE USING SELF-TRAPPING OF LIGHT

[75] Inventors: Alexander E. Kaplan, Cambridge, Mass.; John E. Bjorkholm, Holmdel, N.J.; Peter W. Smith, Colts Neck, N.J.; Walter J. Tomlinson, III, Holmdel, N.J.

[73] Assignee: Bell Telephone Laboratories, Incorporated, Murray Hill, N.J.

[21] Appl. No.: 255,291

[22] Filed: Apr. 17, 1981

[51] Int. Cl.[3] .............................................. G02F 1/35
[52] U.S. Cl. .................................... 350/354; 350/385; 350/390; 350/393; 372/99
[58] Field of Search ....................... 350/379, 385–386, 350/375–376, 390–391, 393, 354, 356, 162.17; 372/103, 1, 96, 99

[56] References Cited

U.S. PATENT DOCUMENTS

| | | | |
|---|---|---|---|
| 3,353,896 | 11/1967 | Blattner | 350/356 |
| 3,434,779 | 3/1969 | Damen et al. | 372/103 |
| 3,931,520 | 4/1976 | Waring, Jr. | 350/354 |
| 4,354,271 | 10/1982 | Hon | 372/96 |

OTHER PUBLICATIONS

Javan et al., "Possibility of Self-Focusing Due to Intensity Dependent Anomalous Dispersion", IEEE Jr. Quantum Electronics, QE 2, 9/66, pp. 470-475.

Bjorkholm et al., "CW Self-Focusing & Self-Trapping of Light in Sodium Vapor", Phys. Rev. Lett., 1/74, pp. 129-132.

Primary Examiner—William H. Punter
Attorney, Agent, or Firm—Daniel D. Dubosky; Erwin W. Pfeifle

[57] ABSTRACT

Many prior art bistable optical devices require resonant optical cavities and are therefore limited in their operation due to the long lifetimes associated with their high-finesse cavities. A bistable optical device that does not use a resonant cavity is disclosed wherein a nonlinear medium whose index of refraction increases with increased light intensity is arranged to have input and output faces into which and out of which a laser beam having a nonuniform spatial profile can be propagated. A mirror having a predetermined area of reflectivity is positioned with respect to the output face of a nonlinear medium so as to reflect only the light energy that propagates in an area at the output face that is approximately equal to the area which the beam presents at this face when the beam is propagating at a critical power level, that is, when the beam is self-trapped.

5 Claims, 2 Drawing Figures

NONLINEAR OPTICAL DEVICE USING SELF-TRAPPING OF LIGHT

BACKGROUND OF THE INVENTION

The study of optically bistable devices and their generic characteristics has received increased attention in the scientific community. See, for example, the special issue on optical bistability *IEEE Journal of Quantum Electronics,* QE-17, March 1981. Bistable optical devices are often classified into one of two categories. In the first category are intrinsic devices which are those devices in which the feedback required for bistability is optical. In the second category are hybrid devices in which devices some form of electrical feedback, sometimes in conjunction with optical feedback, is used. Intrinsic devices are of particular interest because of their potential for ultra-fast switching.

Many of the intrinsic devices known in the prior art require resonant optical cavities. As a result of this characteristic, these prior art intrinsic devices require that the input light to the device be tuned to a special frequency. In addition, these devices are frequently sluggish in their operation due to the long lifetimes associated with their high-finesse cavities. It is expected that the operation of an intrinsic optically bistable device could be improved if the device did not require a resonant cavity.

SUMMARY OF THE INVENTION

The present invention is based upon a fundamentally new type of intrinsic optical bistability. The operation of devices using the present invention is based on self-focusing of light. Self-focusing occurs when a light beam having a nonuniform spatial profile, such as a Gaussian laser beam, progagates through a nonlinear medium having an index of refraction that increases with increased light intensity. When the light intensity increases to a critical power level, $P_{cr}$, the input laser beam passes through the medium with no change in spot size, and this situation is referred to as self-trapping.

In accordance with the present invention a nonlinear medium whose index of refraction increases with increased light intensity is arranged to have input and output faces into which and out of which a light beam having a nonuniform spatial profile can be propagated. A mirror is combined with the output face of the nonlinear medium so as to reflect only the light energy that propagates in an area at the output face that is approximately equal to the area which the beam presents at this face when the beam is propagating at the critical power level, that is, when the beam is self-trapped. When the beam power has been increased to the critical power level, a substantial fraction of the beam will be reflected back into the nonlinear medium. The beam intensity can then be decreased to a lower power level and the beam will remain self-trapped because of the light energy that is reflected from the mirror, and the device will therefore exhibit a bistable optical characteristic.

In the embodiment which was constructed, a lens is positioned behind the output face of the nonlinear medium in order to image the light at the output face of the medium onto a light absorbent disk having an aperture approximately equal in size to the spot size that the beam would have at the disk when the beam is self-trapped. A mirror is positioned on the side of the optically absorbent disk that is opposite to the propagating beam. The mirror is selected to be partially transmitting in order to provide an output optical beam.

BRIEF DESCRIPTION OF THE DRAWING

The invention will be more readily understood after reading the following detailed description in conjunction with the drawing wherein.

DETAILED DESCRIPTION

Figure 1:
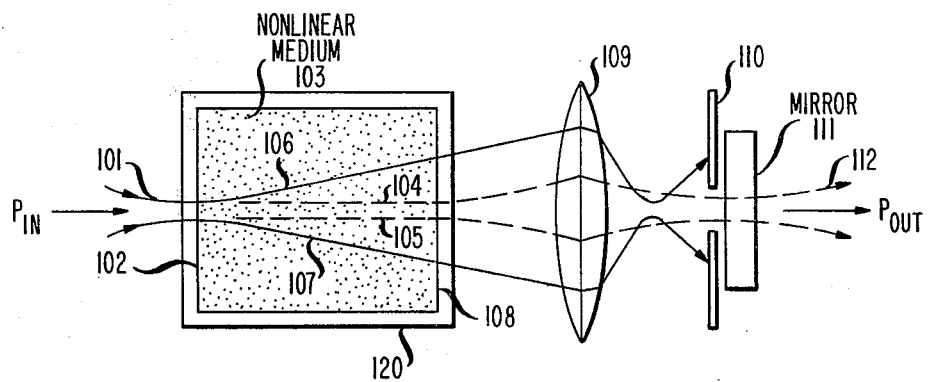
FIG. 1 is a schematic block diagram of an apparatus constructed in accordance with the present invention.

The basic principles upon which the new class of device operates can be understood from a discussion of the apparatus shown in FIG. 1. A laser beam 101 of power, $P_{in}$, having a Gaussian intensity profile is focused onto the input face 102 of a nonlinear medium 103 having an intensity dependent index of refraction. For self-focusing to be possible the medium must be chosen such that its refractive index increases with increasing light intensity. A measure of the strength of this nonlinearity is called the "critical power," $P_{cr}$. When $P_{in} = P_{cr}$, the input laser beam passes through the medium with no change in spot size, as shown by dashed lines 104 and 105; this situation is referred to as "self-trapping." For $P_{in} < P_{cr}$ the laser beam diverges less rapidly than it would in the absence of the nonlinearity and for $P_1 > P_{cr}$ the beam converges. For $P_1 << P_{cr}$ there is essentially no self-focusing; the input focal spot size is chosen such that, for these conditions, the laser beam diverges appreciably in passing through the nonlinear medium, as shown by the solid lines 106 and 107.

The optical field at output face 108 of the nonlinear medium 103 is imaged by a lens 109 onto the partially transmitting mirror 111 which is aligned normal to the laser beam. Immediately in front of the mirror is an appropriately-sized optically absorbent disk 110 having an aperture positioned to permit the self-trapped beam to pass through to the mirror 111. The aperture size is adjusted to satisfy two criteria. First, it must be small enough that in the absence of self-focusing the fraction of the incident light feedback into the nonlinear medium by the mirror is small. Secondly, it is large enough that under self-trapping conditions essentially all the light passes through the aperture and is reflected back upon itself by the mirror. This strong feedback reinforces the self-focusing in the nonlinear medium and it allows self-trapping to be maintained even when the input power is reduced below $P_{cr}$. This is the mechanism which gives rise to the optical bistability and hysteresis. The aperture and mirror could be combined and deposited on the exit face of the nonlinear medium to minimize device length and optical transit times. Clearly other arrangements can be devised by those skilled in the art which lead to optical bistability using the same basic principles.

In the embodiment which was constructed, atomic sodium vapor was utilized as the nonlinear medium 103. Sodium vapor has the virtue of having a large nonlinear index for frequencies near its resonance transitions. In addition, steady-state self-focusing and self-trapping have been observed in it using cw dye lasers. See the article entitled "cw Self-Focusing and Self-Trapping of Light in Sodium Vapor," by J. E. Bjorkholm and A. Ashkin, *Physical Review Letters,* Vol. 32, pages 129–132, Jan. 28, 1974. The sodium vapor was contained in a 20-cm-long heated cell 120 constructed of pyrex. The input laser beam 101 was obtained from a single-mode cw ring dye laser (Spectra-Physics Model 380A). The transverse mode of the laser was TEM$_{00}$ (Gaussian mode) and its focal spot size on the input face 102 of the medium 103 was approximately 80 μm; the corresponding confocal parameter of the laser beam was about 6.8 cm so that in the absence of self-focusing the spot size on the output face 108 of the medium was about 480 μm. A linear polarizer and a quarter wave plate situated between the laser and the vapor cell was used as an isolator; thus circularly polarized light was incident onto the cell. Lens 109 was a 16-cm focal length lens positioned to image the optical field at the exit face 108 of the medium, with unity magnification, onto flat mirror 111 having a reflectance of 94 percent. A disk 110 having an aperture with a diameter of approximately 150 μm was placed several mm in front of the mirror.

Without feedback from the mirror strong self-focusing and self-trapping were readily observed with approximately 150 mW of light tuned roughly 1 GHz above the resonant frequency of the $3S_{\frac{1}{2}}(F=2) \rightarrow 3P_{\frac{1}{2}}$ transition at 5896 Å. The sodium density was nominally $2 \times 10^{12}$ cm$^{-3}$. To observe bistability the mirror was aligned normal to the laser beam and the input light was amplitude modulated at about 50 Hz with a spinning transmission grating composed of closely spaced fine wires. The input power (P$_{in}$) of beam 101 and the power of beam 112 passing through the mirror 111 (P$_{out}$) were monitored as functions of time using photodiodes and a dual-channel digital oscilloscope (Nicolet Explorer II); the signals were also displayed and recorded as P$_{out}$ vs. P$_{in}$.

Figure 2:
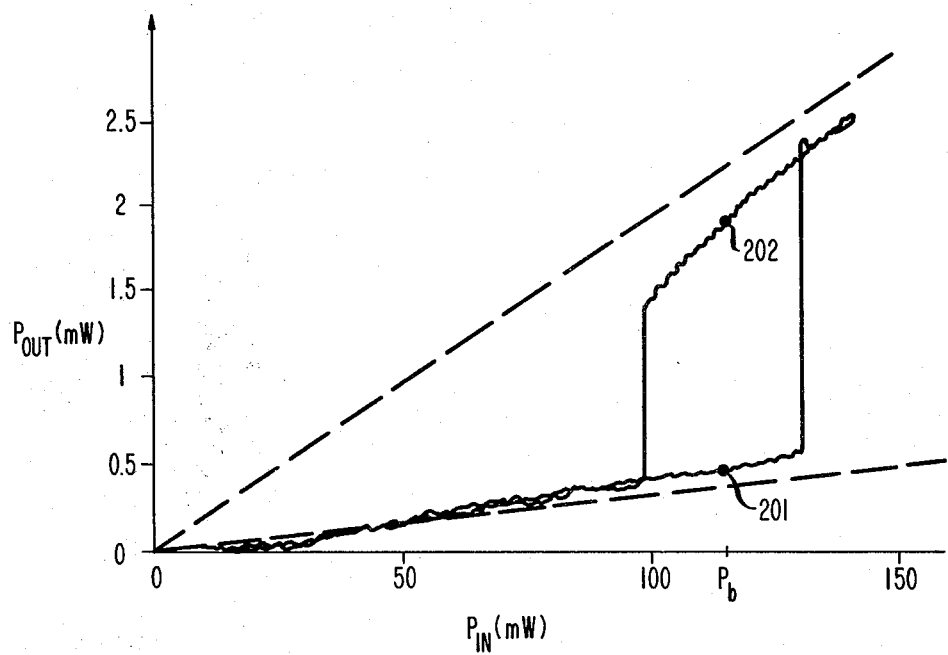
FIG. 2 is a graph of optical output power versus input power for the device shown in FIG. 1.

FIG. 2 presents data obtained when the parameters of the device were adjusted to exhibit bistable behavior; the laser was tuned roughly 1 GHz above the $3S_{\frac{1}{2}}(F=2) \rightarrow 3P_{\frac{1}{2}}$ transition. As the input power was increased upward, switching from a low-transmission state to a high-transmission state occurred at an input power of about 130 mW. At the switching point, the transmission abruptly increased by a factor of 4.1; the rise-time of the switch was about 20 μsec. With input power decreasing, a downward switch of the same speed occurred at about 95 mW of input power. Optical pumping of sodium undoubtedly plays a role in the nonlinearity of the medium and the observed switching time may be more characteristic of optical pumping than of the switching process itself. The dashed lines show the calculated low and high transmission limits, based on the measurement of 45 mW incident onto the 0.15 mm aperture for an input power of 140 mW and no feedback. The high transmission limit assumes 100 percent transmission by the aperture. The upward switch occurs at a power level roughly equal to P$_{cr}$. Visual observation of the resonance fluorescence induced by the laser beam showed dramatically that, at switching, the laser beam abruptly changes from diverging propagation to what appeared to be self-trapping. Under different conditions several switching levels and several hysteresis loops were obtained, perhaps corresponding to oscillations of the spot size as the laser beam propagated through the self-focusing medium.

As will be readily apparent to those skilled in the art, a device that exhibits the bistable characteristic of the type shown in FIG. 2 can function as a memory element. For example, the device can be biased at an input power level of P$_b$ at a point substantially midway between the two step changes shown in FIG. 2. At this bias level of P$_b$, the output power level is dependent on the previous history of input power levels. If the input power level is increased to a value in excess of 130 mW and then returned to the bias level of P$_b$ the device will operate at the point designated as 202 in FIG. 2 and an output power level of about 1.9 mW will be present. If on the other hand the input power level is decreased to a value below 95 mW and then returned to the bias level of P$_b$ the device will operate at a point corresponding to 201 in FIG. 2 and an output power level of about 0.5 mW will be present. In this way, the device remembers what the previous input power level has been and can therefore function as an optical memory.

What has been described hereinabove is an illustrative embodiment of the present invention. Numerous departures may be made by those skilled in the art without departing from the spirit and scope of the present invention. For example, if the medium 103 has a sufficiently strong nonlinearity, the entire device may be scalable to short lengths giving the potential for fast response times. By focusing the input laser beam in such a device to a spot size on the order of λ, the wavelength of the light, device lengths on the order of 50λ with corresponding transit times for the light of about 0.2 psec, should be possible.

What is claimed is:

1. A nonlinear bistable optical device for use with an input light beam having a nonuniform spatial profile comprising a nonlinear medium (103) having an input face (102) and an output face (108), said nonlinear medium having an index of refraction that increases with increasing light intensity, and means (109, 110 and 111) including a reflective central aperture positioned at the output face of said nonlinear medium for reflecting light back into the medium only from a limited central area of said output face.

2. A nonlinear bistable optical device as defined in claim 1 wherein said limited central area has a diameter approximately equal to the diameter of an optical beam propagating within said nonlinear medium at the self-trapping power level.

3. A nonlinear bistable optical device as defined in claim 1 wherein the means for reflecting light comprises an optically absorbent disk (110) having an aperture approximately equal to the diameter of an optical beam propagating within said nonlinear medium at the self-trapping power level, and a partially transmitting mirror (111) positioned adjacent to said disk with the disk between said medium and said mirror.

4. A nonlinear bistable optical device as defined in claim 3 wherein said means for reflecting light further includes a lens (109) positioned between said disk and said medium.

5. A nonlinear bistable optical device as defined in claim 4 wherein said nonlinear medium is an atomic sodium vapor contained in a heated cell (120) constructed of pyrex.

* * * * *